United States Patent
Fushimi et al.

(10) Patent No.: US 12,275,028 B2
(45) Date of Patent: Apr. 15, 2025

(54) POWDERY-MATERIAL MIXING AND FEEDING SYSTEM

(71) Applicant: KIKUSUI SEISAKUSHO LTD., Kyoto (JP)

(72) Inventors: Shinsuke Fushimi, Kyoto (JP); Hideyuki Nishimura, Kyoto (JP); Yuuya Kawai, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 264 days.

(21) Appl. No.: 17/887,018

(22) Filed: Aug. 12, 2022

(65) Prior Publication Data

US 2023/0075811 A1    Mar. 9, 2023

(30) Foreign Application Priority Data

Sep. 6, 2021    (JP) .................. 2021-144513

(51) Int. Cl.
*B05B 12/08*    (2006.01)
*B05B 7/14*    (2006.01)
*B05B 12/00*    (2018.01)

(52) U.S. Cl.
CPC .......... *B05B 12/087* (2013.01); *B05B 7/1404* (2013.01); *B05B 7/1486* (2013.01); *B05B 12/008* (2013.01); *B05B 12/081* (2013.01)

(58) Field of Classification Search
CPC ... B05B 12/087; B05B 7/1404; B05B 7/1486; B05B 12/008; B05B 12/081; B01F 23/60;

(Continued)

(56) References Cited

U.S. PATENT DOCUMENTS

| 4,498,783 | A | 2/1985 | Rudolph |
| 4,544,279 | A | 10/1985 | Rudolph |

(Continued)

FOREIGN PATENT DOCUMENTS

| EP | 3926308 A1 | 12/2021 |
| JP | 6857896 B2 | 4/2021 |
| WO | WO 2013/182870 A1 | 12/2013 |

OTHER PUBLICATIONS

"Feeder manufactured by Coperion K-TRON (registered trademark (international registration))", [online], Apte Inc., [searched on Jun. 20, 2021] URL:https://www.coperion.com/en/products-services/process-equipment/feeders.

(Continued)

*Primary Examiner* — Donnell A Long
(74) *Attorney, Agent, or Firm* — MCGINN I.P. LAW GROUP, PLLC

(57) ABSTRACT

A powdery-material mixing and feeding system is configured to feed a machine configured to execute a post process with mixed-powdery materials obtained by mixing a first powdery material and a second powdery material discharged from powdery-material feeding devices at a required ratio, wherein when a flow rate of the first powdery material discharged from the first powdery-material feeding device departs from a target value by a predetermined amount or more, a controller increases or decreases the flow rate of the second powdery material discharged from the second powdery-material feeding device such that the ratio of the first powdery material to the second powdery material contained in the mixed-powdery materials is kept within a desired range.

20 Claims, 6 Drawing Sheets

(58) Field of Classification Search
CPC .. B01F 27/96; B01F 33/811; B01F 35/75455; B01F 35/8311; G05D 11/134; B30B 15/26; B30B 15/308; B30B 11/08
See application file for complete search history.

(56) References Cited

U.S. PATENT DOCUMENTS

| | | | |
|---|---|---|---|
| 5,127,450 | A | 7/1992 | Saatkamp |
| 10,899,041 | B2 | 1/2021 | Kruempel et al. |
| 11,104,036 | B2 | 8/2021 | Kruempel et al. |
| 2017/0259458 | A1 | 9/2017 | Kruempel et al. |
| 2017/0341266 | A1 | 11/2017 | Kruempel et al. |
| 2018/0264490 | A1 | 9/2018 | Fushimi et al. |
| 2019/0193309 | A1* | 6/2019 | Kitamura ............ B30B 15/0011 |
| 2019/0329451 | A1 | 10/2019 | Kruempel et al. |
| 2019/0337190 | A1 | 11/2019 | Kruempel et al. |
| 2020/0070388 | A1* | 3/2020 | Kitamura .............. B29C 43/183 |
| 2021/0394133 | A1 | 12/2021 | Walter et al. |

OTHER PUBLICATIONS

"Theory of circle feeder", [online], Yoshikawa Corporation, [searched on Jun. 20, 2021] URL:https://www.yoshikawa-cf.co.jp/english/products/archives/1.

* cited by examiner

POWDERY-MATERIAL MIXING AND FEEDING SYSTEM

BACKGROUND

Conventionally, a production site of a pharmaceutical tablet or the like has typically adopted a procedure according to a batch method including forming, from powdery materials as constituent materials, an intermediate product in each of processes such as granulating, drying, grading, and mixing, supplying a compression-molding machine with mixed-powdery materials thus obtained, and compressing (i.e., tableting) with use of the molding machine.

However, such a batch method includes stand-by periods between the processes. For example, compressing with use of the molding machine needs previously mixing the powdery materials and supplying the molding machine with the powdery materials thus obtained by mixing. The molding machine is to stand-by without operating during the processes. In other words, the batch method fails to achieve a timely feeding of an intermediate product. The batch method also needs facility design for each of the processes and occupation of a large space. More specifically, each of the processes needs a separate chamber as well as troublesome delivery by a worker of an intermediate product from a chamber for a previous process to a chamber for a subsequent process.

In view of this, there has been developed a system configured to directly feed a molding machine with mixed-powdery materials in order to consistently execute mixing and compressing of the powdery materials with no interruption (see Japanese Patent No. 6857896). This system achieves appropriate feeding of the mixed-powdery materials to the molding machine that is continuously compressing and tableting the powdery materials.

A powdery-material mixing and feeding system configured to mix powdery materials includes a plurality of powdery-material feeding devices each configured to reserve a powdery material and discharge the reserved powdery material, and is configured to mix the powdery materials discharged from the powdery-material feeding devices and then feed the mixed-powdery materials to a molding machine and another machine configured to execute a post process.

Typical examples of the powdery-material feeding devices include a volumetric feeder configured to continuously discharge a constant amount of a powdery material per predetermined time (see "Feeder manufactured by COPE-RION K-TRON (registered trademark (international registration))", [online], Apte Inc., [searched on Jun. 20, 2021], and "Theory of circle feeder", [online], YOSHIKAWA Corporation, [searched on Jun. 20, 2021]). The device is configured to deliver a powdery material dropping from a hopper reserving the powdery material by means of a screw feeder, a table feeder, a circle feeder (registered trademark), a rotary feeder, or the like. The screw feeder or the like discharges the powdery material having a flow rate per unit time, which is measured by a measuring instrument such as a load cell. A motor functioning as a drive source of the screw feeder or the like is feedback-controlled such that the flow rate of the discharged powdery material converges to a target value thereof.

As each of the powdery-material feeding devices discharges the powdery material, the powdery material reserved in the hopper gradually decreases in amount. The hopper is obviously to be refilled with a powdery material as needed. When one of the powdery-material feeding devices has rapid variation in flow rate of the discharged powdery material due to a significant change in an amount or a density of the powdery material in the hopper or any other reason, a ratio of the powdery material fed from the powdery-material feeding device to the powdery material fed from the remaining powdery-material feeding device(s) may depart from a desired range (i.e., be out of range). Mixed-powdery materials obtained by mixing these powdery materials are a defective product that should not be fed to a machine configured to execute a post process such as a molding machine.

SUMMARY OF THE INVENTION

It is an exemplary object of the present invention to constantly keep a ratio of powdery materials constituting mixed-powdery materials within a desired range in a system configured to mix a plurality of powdery materials discharged respectively from a plurality of powdery-material feeding devices and feed the mixed-powdery materials to a machine configured to execute a post process.

In order to achieve the exemplary object and others, the exemplary invention provides a powdery-material mixing and feeding system including a first powdery-material feeding device configured to reserve and discharge a first powdery-material and a second powdery-material feeding device configured to reserve and discharge a second powdery material, the system being configured to feed a machine configured to execute a post process with mixed-powdery materials obtained by mixing the first powdery material and the second powdery material discharged from the powdery-material feeding devices at a required ratio, in which a controller is included for controlling a flow rate of the first powdery material discharged from first powdery-material feeding device and a flow rate of the second powdery material discharged from the second powdery-material feeding device to converge to respective target values thereof, wherein when the flow rate of the first powdery material discharged from the first powdery-material feeding device departs from the target value by a predetermined amount or more, the controller increases or decreases the flow rate of the second powdery material discharged from the second powdery-material feeding device such that the ratio of the first powdery material to the second powdery material contained in the mixed-powdery materials is kept within a desired range.

According to the exemplary invention, when the flow rate of the first powdery material discharged from the first powdery-material feeding device has rapid variation, the flow rate of the second powdery material discharged from the other second powdery-material feeding device is adjusted by increasing or decreasing the flow rate of the discharged second powdery-material, such that the ratio of the first powdery material to the second powdery material does not depart from the desired range.

Each of the first powdery-material feeding device and the second powdery-material feeding device includes a hopper configured to reserve the powdery material, a transfer member configured to deliver to discharge the powdery material fed from the hopper, a motor configured to drive the transfer member, and a measuring instrument configured to measure an amount of the powdery material delivered by the transfer member to be discharged. The controller adjusts, in a normal state, a rotational speed of the motor or current or voltage applied to a coil of the motor in each of the first powdery-material feeding device and the second powdery-material feeding device, such that the flow rate of the discharged powdery material measured by the measuring instrument is converged to the target value, and adjusts the rotational speed of the motor or the current or the voltage applied to the coil of the motor in the second powdery-material feeding device to increase or decrease the flow rate of the discharged second powdery material measured by the measuring instrument in the second powdery-material feeding device, such that the ratio of the first powdery material to the second powdery material contained in the mixed-powdery materials is kept within the desired range when the flow rate of the discharged first powdery material measured by the measuring instrument in the first powdery-material feeding device departs from the target value by the predetermined amount or more.

More specifically, there are set a correction condition value close to but unequal to and deviated from the target value of the flow rate of the discharged first powdery material, and an abnormality detection value more apart (i.e., remote) from the target value of the flow rate of the discharged first powdery material in comparison with the correction condition value, the controller keeps without changing the rotational speed of the motor or the current or the voltage applied to the coil of the motor in the first powdery material when the flow rate of the first powdery material measured by the measuring instrument in the first powdery-material feeding device falls between the target value and the correction condition value, adjusts the rotational speed of the motor or the current or the voltage applied to the coil of the motor in the first powdery-material feeding device such that the flow rate of the first powdery material falls between the target value and the correction condition value when the flow rate of the first powdery material measured by the measuring instrument in the first powdery-material feeding device, falls between the correction condition value and the abnormality detection value, and adjusts the rotational speed of the motor or the current or the voltage applied to the coil of the motor in the second powdery-material feeding device to increase or decrease the flow rate of the discharged second powdery material measured by the measuring instrument in the second powdery-material feeding device, such that the ratio of the first powdery material to the second powdery material contained in the mixed-powdery materials is kept within the desired range when the flow rate of the first powdery material measured by the measuring instrument in the first powdery-material feeding device does not fall between the target value and the abnormality detection value. In a case where the flow rate of the first powdery material discharged from the first powdery-material feeding device and the target value have a relatively small difference (e.g., the flow rate of the discharged first powdery material does not exceed the abnormality detection value), such control achieves adjustment of the flow rate of the first powdery material discharged from the first powdery-material feeding device without particularly increasing or decreasing the flow rate of the second powdery material discharged from the second powdery-material feeding device without significant variation in supply amount per unit time of the mixed-powdery materials obtained by mixing the first powdery material and the second powdery material. In another case where the flow rate of the discharged first powdery material and the target value have a large difference (e.g., the flow rate of the discharged first powdery material exceeds the abnormality detection value), the flow rate of the second powdery material discharged from the second powdery-material feeding device is increased or decreased such that the ratio of the first powdery material to the second powdery material contained in the mixed-powdery materials falls within the desired range. It is then possible to continuously, without no interruption, feed the mixed-powdery materials to a machine configured to execute a post process.

A powdery material is an aggregate of minute solids and conceptually includes an aggregate of particles such as so-called granules and an aggregate of powder smaller than such particles. Specific examples of the powdery material include a powdery material containing a principal agent, an excipient, a binder, a disintegrant, a stabilizer, and a preservative. The powdery material according to the exemplary invention also includes a mixture of two or more types of powdery materials, and a powdery material containing the principal agent mixed with a lubricant such as magnesium stearate.

The exemplary invention may achieve constantly keeping a ratio of powdery materials constituting mixed-powdery materials within a desired range in a system configured to mix a plurality of powdery materials discharged respectively from a plurality of powdery-material feeding devices and feed the mixed-powdery materials to a machine configured to execute a post process.

BRIEF DESCRIPTION OF THE DRAWIMGS

The exemplary aspects of the invention will be better understood from the following detailed description of the exemplary embodiments of the invention with reference to the drawings.

DETAILED DESCRIPTION OF AN EXEMPLARY EMBODIMENT

An exemplary embodiment of the invention will now be described with reference to the drawings. Initially described is an outline of a rotary compression-molding machine (hereinafter, referred to as the "molding machine") A according to the exemplary embodiment.

Figure 1:
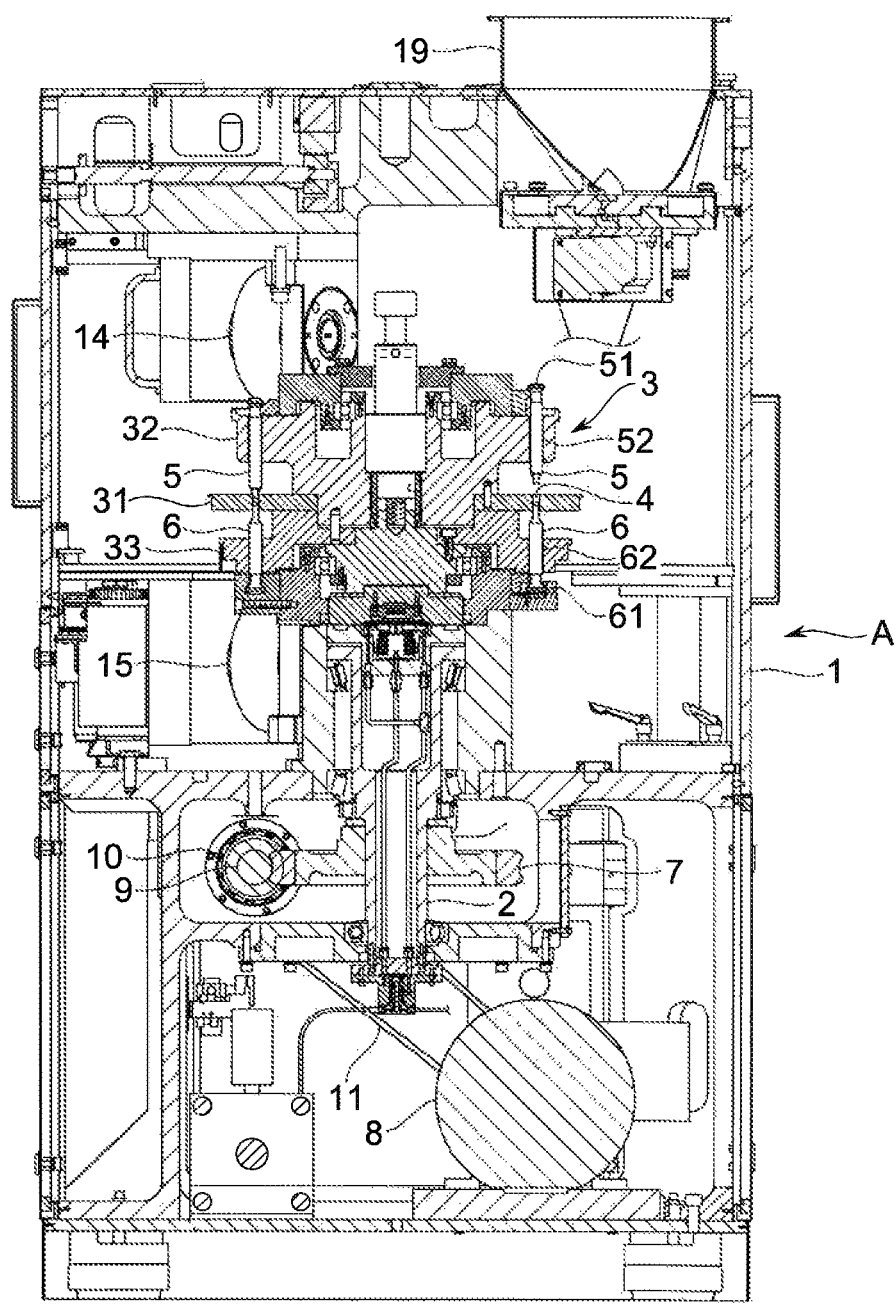
FIG. 1 is a sectional side view of a compression-molding machine according to an exemplary embodiment of the invention.

As shown exemplarily in FIG. 1, the machine A is configured to conduct post treatment of mixed-powdery materials discharged to be fed from a powdery-material feeding device according to the exemplary embodiment.

The molding machine A is configured to fill each die bore 4 with mixed-powdery materials and compress the powdery materials with punches 5 and 6 to mold a pharmaceutical tablet, a food product, an electronic component, or the like. As shown exemplarily in FIG. 1, the molding machine A includes a frame 1 accommodating an upright shaft 2 functioning as a rotary shaft, and a turret 3 is attached to a connection portion 21 that is disposed at the top of the upright shaft 2.

The turret 3 horizontally rotates about the upright shaft 2, and more specifically, spins thereabout. The turret 3 includes a table (e.g., a die disc) 31, an upper punch-retaining portion 32, and a lower punch-retaining portion 33. As shown exemplarily in FIG. 2, the die table 31 has a substantially circular disc shape, and has a plurality of die bores 4 that is disposed in an outer circumferential portion and is aligned in a direction of rotation at predetermined intervals. Each of the die bores 4 vertically penetrates the table 31. The die table 31 is alternatively divided into a plurality of plates. Instead of forming the die bores 4 by directly drilling into the die table 31, the die table 31 is alternatively provided with a plurality of die members that is separate from the die table 31 and is detachably attached thereto. In this case, each of the die members has a die bore penetrating vertically.

The die bores 4 are each provided with an upper punch 5 and a lower punch 6 disposed above and below the die bore 4, respectively. As shown exemplarily in FIG. 3, the upper punches 5 and the lower punches 6 are retained by the upper punch-retaining portion 32 and the lower punch-retaining portion 33 so as to be independently slidable vertically with respect to corresponding one of the die bores 4. The upper punches 5 each have a tip 53 that enters and exits corresponding one of the die bores 4. As further shown exemplarily in FIG. 3, the lower punches 6 each have a tip 63 that is kept inserted in a corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 through a belt 11, so as to drive and to rotate the upright shaft 2 by the worm gear 10 and the worm wheel 7, and further to rotate the turret 3 and the punches 5 and 6.

Figure 4:
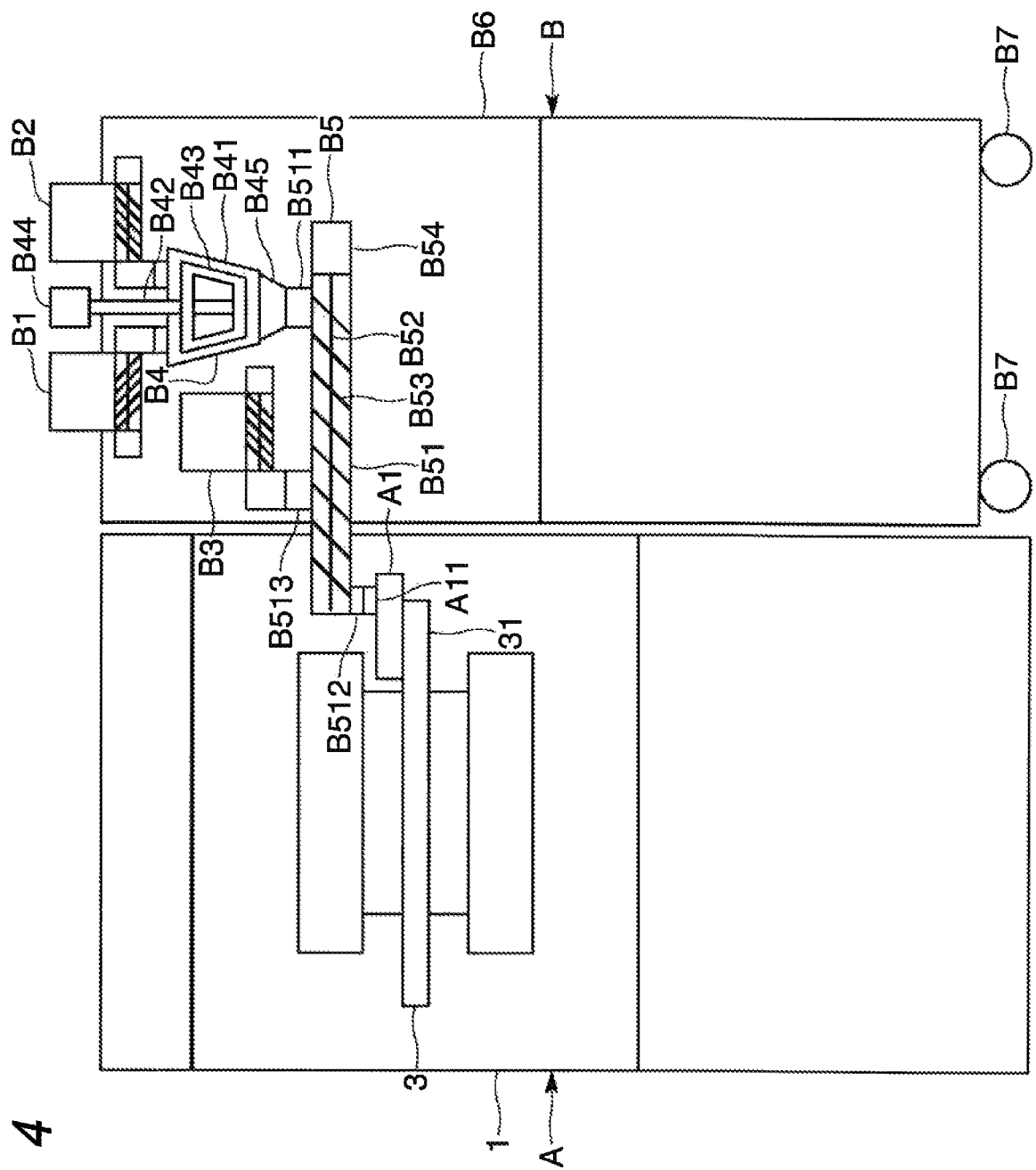
FIG. 4 is a side view schematically showing configurations of the compression-molding machine and a powdery-material mixing and feeding system according to the exemplary embodiment.

A powdery material as a raw material for a compression molded product like a pharmaceutical tablet is filled in the die bores 4 with use of a feeder A1 serving as a filling device. The feeder A1 can be an agitated feeder or a gravity feeder, either one of which is applicable to the exemplary invention. The powdery material is fed to the feeder A1 with use of a powdery-material mixing and feeding system B (shown in FIG. 4) including the powdery-material feeding device to be described later. The powdery-material mixing and feeding system B is detachably attached to the molding machine A.

Figure 2:
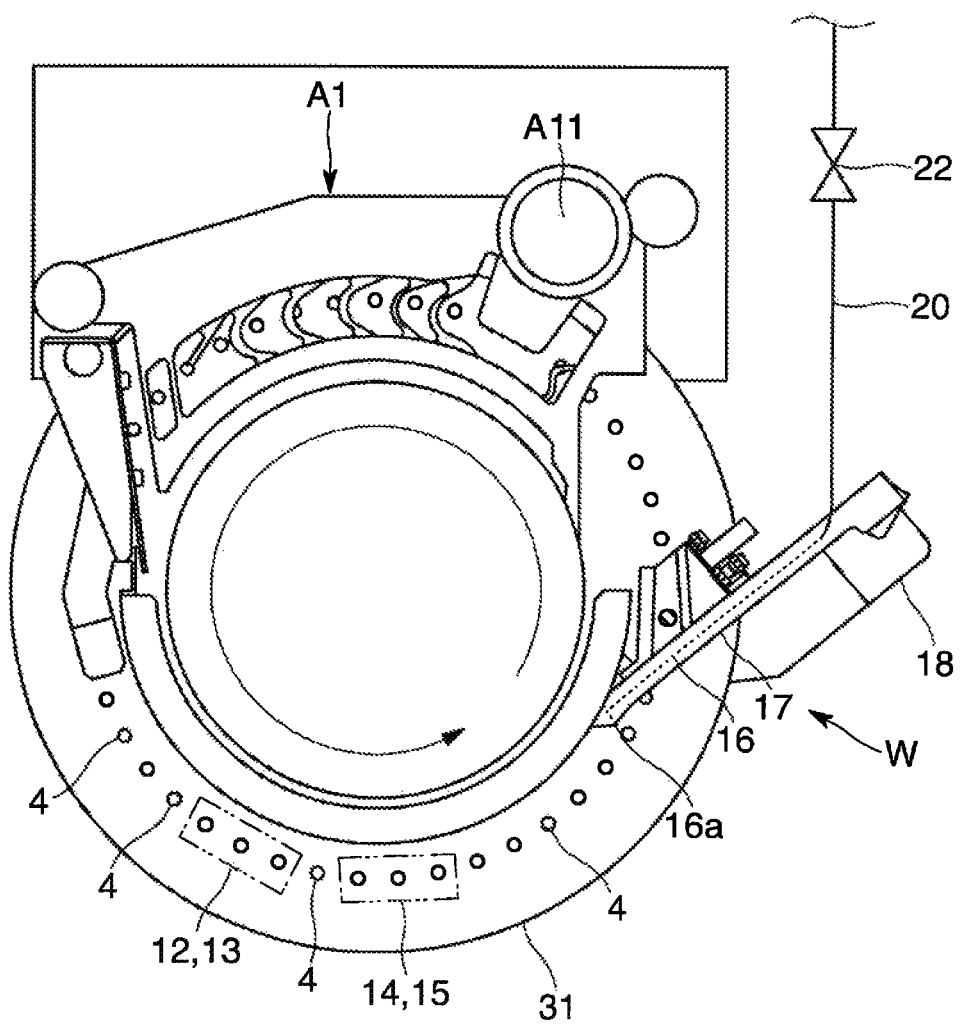
FIG. 2 is a plan view of a main part of the compression-molding machine according to the exemplary embodiment.
Figure 3:
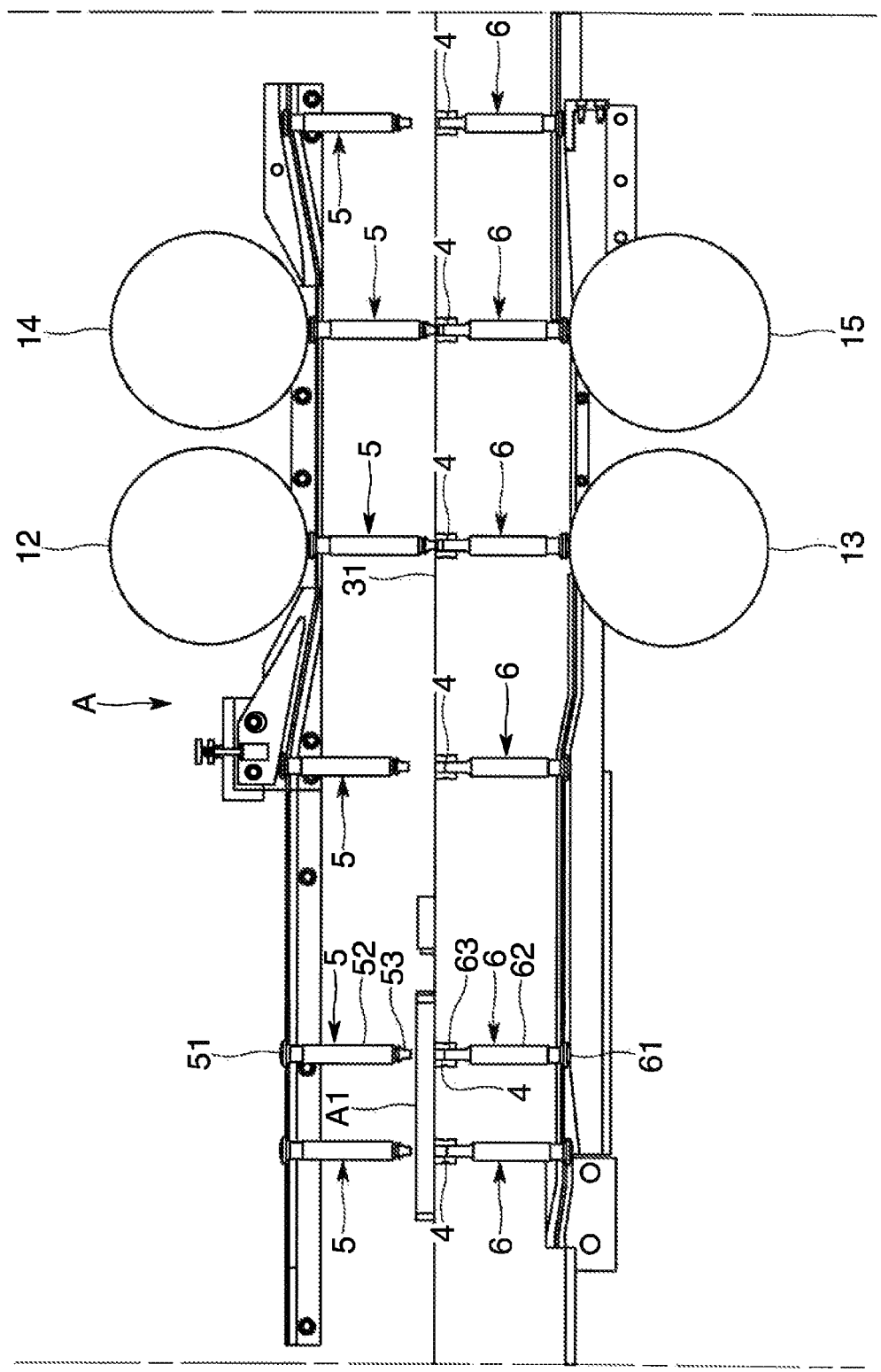
FIG. 3 is a cylindrical view of the compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6. The preliminary compression upper roll 12 and the preliminary compression lower roll 13 as well as the substantial compression upper roll 14 and the substantial compression lower roll 15 bias the upper and lower punches 5 and 6 to bring the upper and lower punches 5 and 6 closer to each other, so that the tips 53 and 63 compress from above and below the powdery material filled in the die bores 4.

The upper and lower punches 5 and 6 have the heads 51 and 61 pressed by the rolls 12, 13, 14, and 15, and the trunks 52 and 62 are smaller in diameter than the heads 51 and 61. The upper punch-retaining portion 32 (e.g., shown in FIG. 1) of the turret 3 vertically slidably retains the trunks 52 of the upper punches 5, whereas the lower punch-retaining portion 33 vertically slidably retains the trunks 62 of the lower punches 6. The tips 53 and 63 of the trunks 52 and 62 are thinner than the remaining portions and are substantially equal in diameter to an inner diameter of the die bores 4 so as to be inserted to the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 so as to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a product-unloading portion disposed ahead, in the rotation direction of the turret 3 and the punches 5 and 6, of a portion pressed by the substantial compression upper roll 14 and the substantial compression lower roll 15. At the product-unloading portion, the lower punch 6 ascends until the upper end surface of the tip 63 of the lower punch 6 becomes substantially as high as the upper end of the die bore 4, or the upper surface of the die table 31, and pushes a molded product out of the die bore 4. The product-unloading portion includes a guide member 17 (e.g., see FIG. 2) configured to guide the molded product pushed out of each of the die bores 4. The molded product pushed out of each of the die bores 4 is brought into contact with the guide member 17 due to rotation of the turret 3, and is shifted along the guide member 17 toward a molded product collecting position 18.

The powdery-material mixing and feeding system B according to the exemplary embodiment will be described next in terms of its configuration. The powdery-material mixing and feeding system B is configured to feed a machine configured to conduct a post treatment, and specifically, the molding machine A herein, with mixed-powdery materials. As shown exemplarily in FIG. 4, the system B includes a plurality of volumetric feeders B1, B2, and B3 functioning as powdery-material feeding devices each configured to reserve a powdery material and discharge the reserved powdery material, and mixers B4 and B5 each configured to mix the powdery materials discharged from the plurality of volumetric feeders B1 to B3 and to discharge the mixed-powdery materials.

The powdery-material mixing and feeding system B includes the three volumetric feeders B1 to B3. The number of the feeders B1 to B3 is changed in accordance with the number of types of powdery materials to be mixed. There can be included two, or four or more feeders. The volumetric feeders B1 to B3 can discharge different types of powdery materials or discharge a single type of a powdery material. The volumetric feeders B1 to B3 can each discharge multiple types of powdery materials preliminarily mixed. Examples of a type of a powdery material include a powdery material containing a principal agent, an excipient, a binder, a disintegrant, a lubricant, a stabilizer, and a preservative. According to the exemplary embodiment, the feeder B1 functioning as a first powdery-material feeding device discharges to feed a principal agent serving as a first powdery material, the feeder B2 functioning as a second powdery-material feeding device discharges to feed an excipient like lactose, or a different powdery material, serving as a second powdery material, and the feeder B3 functioning as a third powdery-material feeding device discharges to feed a lubricant like magnesium stearate serving as a third powdery material.

The mixers B4 and B5 are configured by a vertical mixer B4 and a horizontal mixer B5 connected to and disposed downstream of the vertical mixer B4. The vertical mixer B4 mixes the powdery material discharged from the feeder B1 (i.e., the principal agent), and the powdery material discharged from the feeder B2 (i.e., the excipient or the different powdery material), and simultaneously drops the mixed-powdery materials toward the horizontal mixer B5. The vertical mixer B4 includes a case B41 having a funnel shape, a vertical or substantially vertical agitation shaft B42 disposed in a center portion in the case and configured to spin, an agitating rotor B43 integrally attached to the agitation shaft, and a motor B44 configured to drive and to rotate the agitation shaft B42 and the agitating rotor B43.

The powdery materials discharged from the feeders B1 and B2 are dropped into the case of the vertical mixer B4 from thereabove. These powdery materials come into contact with the rotating agitating rotor B43, and are shifted downward in the case B41 while being agitated by the agitating rotor B43. The case B41 has a lower portion having a large number of bores (not shown) preliminarily provided to penetrate the case B41, and the mixed-powdery materials agitated in the case B41 flow out of the case B41 through the bores. The mixed-powdery materials then flow into the horizontal mixer B5 through a connection port B45.

The horizontal mixer B5 mixes the powdery materials mixed by the vertical mixer B4 (i.e., the principal agent and the excipient or the different powdery material), and the powdery material discharged from the feeder B3 (i.e., the lubricant), and simultaneously transfers the mixed-powdery materials toward the feeder A1 of the molding machine A. The horizontal mixer B5 includes a case B51 having a tubular shape extending horizontally or substantially horizontally, a horizontal or substantially horizontal agitation shaft B52 disposed in a center portion in the case B51 and configured to spin, an agitating rotor B53 attached to the agitation shaft B52, and a motor B54 configured to drive to rotate the agitation shaft B52 and the agitating rotor B53.

The case B51 has, at a laterally outer end, a reception port B511 connected to the connection port of the vertical mixer B4. The case B51 further has, at a laterally inner end, a discharge port B512 connected to a feed port A11 that connects the interior and the exterior of the feeder A1 and is configured to feed the feeder A1 with a powdery material. The case B51 still further has, in an intermediate portion, a reception port B513 connected to the feeder B3. The agitation shaft B52 and the agitating rotor B53 are agitating members configured to rotate while being in contact with powdery materials to be mixed so as to mix the powdery materials and simultaneously transfer the powdery materials in a direction crossing the vertical direction. The agitating members B52 and B53 extend to a point just before the discharge port B512 at terminal ends of the mixers B4 and B5.

The powdery materials mixed by the vertical mixer B4 are supplied from the connection port B45 into the case B51 of the horizontal mixer B5 via the reception port B511. The powdery materials come into contact with the rotating agitating rotor B53, and are shifted from laterally outside to laterally inside in the case B51 while being agitated by the agitating rotor B53. During this process, the powdery material discharged from the feeder B3 is supplied into the case B51 through the reception port B513, and the powdery materials are further agitated by the agitating rotor B53. The principal agent fed from the feeder B1, the excipient or the different powdery material fed from the feeder B2, and the lubricant fed from the feeder B3 are thus mixed in the case B51 and are simultaneously transferred along the case B51. The mixed-powdery materials are eventually discharged from the discharge port B512 and are fed to the feed port A11 of the feeder A1 in the molding machine A. The feeder A1 fills each of the die bores 4 provided in the die table 31 with the mixed-powdery materials fed to the feed port A11.

The feeder A1 preliminarily includes a sensor (not shown) configured to measure a mixing degree of mixed-powdery materials fed from the powdery-material mixing and feeding system B. There are various methods of measuring a mixing degree of powdery materials, including Raman spectroscopy, infrared spectroscopy, X-ray diffraction, X-ray transmission measurement, and high performance liquid chromatography (HPLC). Any method achieving prompt measurement of a mixing degree is applicable to the exemplary invention. In an exemplary case where the near infrared reflectance (NIR, or a near infrared absorption spectrum method) is adopted, in order to evaluate an amount or a percentage (i.e., a ratio) of the principal agent in the mixed-powdery materials (i.e., uniformity of the mixed-powdery materials) (whether or not the mixed-powdery materials are segregated), the shifting mixed-powdery materials are irradiated with near infrared light to measure light absorption and scattering for qualitative and quantitative analyses of a concentration and the like of the principal agent based on a spectrum. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials. When the near infrared reflectance is adopted, the feeder A1 includes a near infrared sensor as a process analytical technology (PAT) sensor configured to measure a mixing degree or the like of powdery materials.

The product-unloading portion of the molding machine A further includes a molded product removal mechanism W (e.g., see FIG. 2) configured to select a specific molded product, such as a defective product or a sampled product from among molded products collected at the molded product collecting position 18. Specifically, the guide member 17 is provided therein with an air passage 16 for a pressurized air flow, and the air passage 16 has a distal end functioning as an air spray nozzle 16a opened laterally outward in the radial direction of the turret 3. A flow passage 20 connects an air feed source (not shown) such as a pump configured to feed pressurized air and the air passage 16, and a control valve 22 is disposed on the flow passage 20 to open and close the flow passage 20. Examples of the control valve 22 include an electromagnetic solenoid configured to open in accordance with a control signal transmitted from a control device or the like.

If the control valve 22 is opened while a specific molded product pushed out of the die bore 4 is passing by the air spray nozzle 16a before contacting the guide member 17, then the air spray nozzle 16a discharges pressurized air fed from the air feed source through the flow passage 20 and the air passage 16 in the guide member 17. The discharged air blows the specific molded product outward from the table 31. The blown molded product will not reach the molded product collecting position 18 ahead of the guide member 17. As described above, the molded product removal mechanism W in the molding machine A according to the exemplary embodiment includes the passages 16 and 20 for air fed from the air feed source, the air spray nozzle 16a, and the control valve 22.

If composition, the mixing degree, or the like of the mixed-powdery materials measured by the near infrared sensor or the like included in the feeder A1 is inappropriate, then the mixed-powdery materials in the feeder A1 are once filled in the die bore 4 of the die table 31 in the compression-molding machine A and are compression-molded by the upper and lower punches 5 and 6 into the shape of the molded product. The molded product is then removed by the molded product removal mechanism W before reaching the molded product collecting position 18. Specifically, the control valve 22 in the molding machine A is opened when the die bore 4 filled with defective mixed-powdery materials tableted into a molded product passes by the air spray nozzle 16a, and the air spray nozzle 16a sprays air to blow the molded product out of the die table 31. In addition, an alarm sound can be issued, the device can be stopped, or the like.

When the powdery-material mixing and feeding system B is connected to the molding machine A, an inner end and the discharge port B512 of the case B51 of the horizontal mixer B5 are inserted to the frame 1 of the molding machine A. Meanwhile, the remaining elements of the powdery-material mixing and feeding system B, and specifically, the portion other than the inner end of the case B51 of the horizontal mixer B5, the vertical mixer B4, and the volumetric feeders B1 to B3 are kept outside of the frame 1 of the molding machine A. The powdery-material mixing and feeding system B includes a support body (i.e., a frame or a housing) B6 that supports the volumetric feeders B1 to B3, the vertical mixer B4, and the horizontal mixer B5 and has a bottom including casters B7 configured to easily shift the powdery-material mixing and feeding system B.

Figure 5:
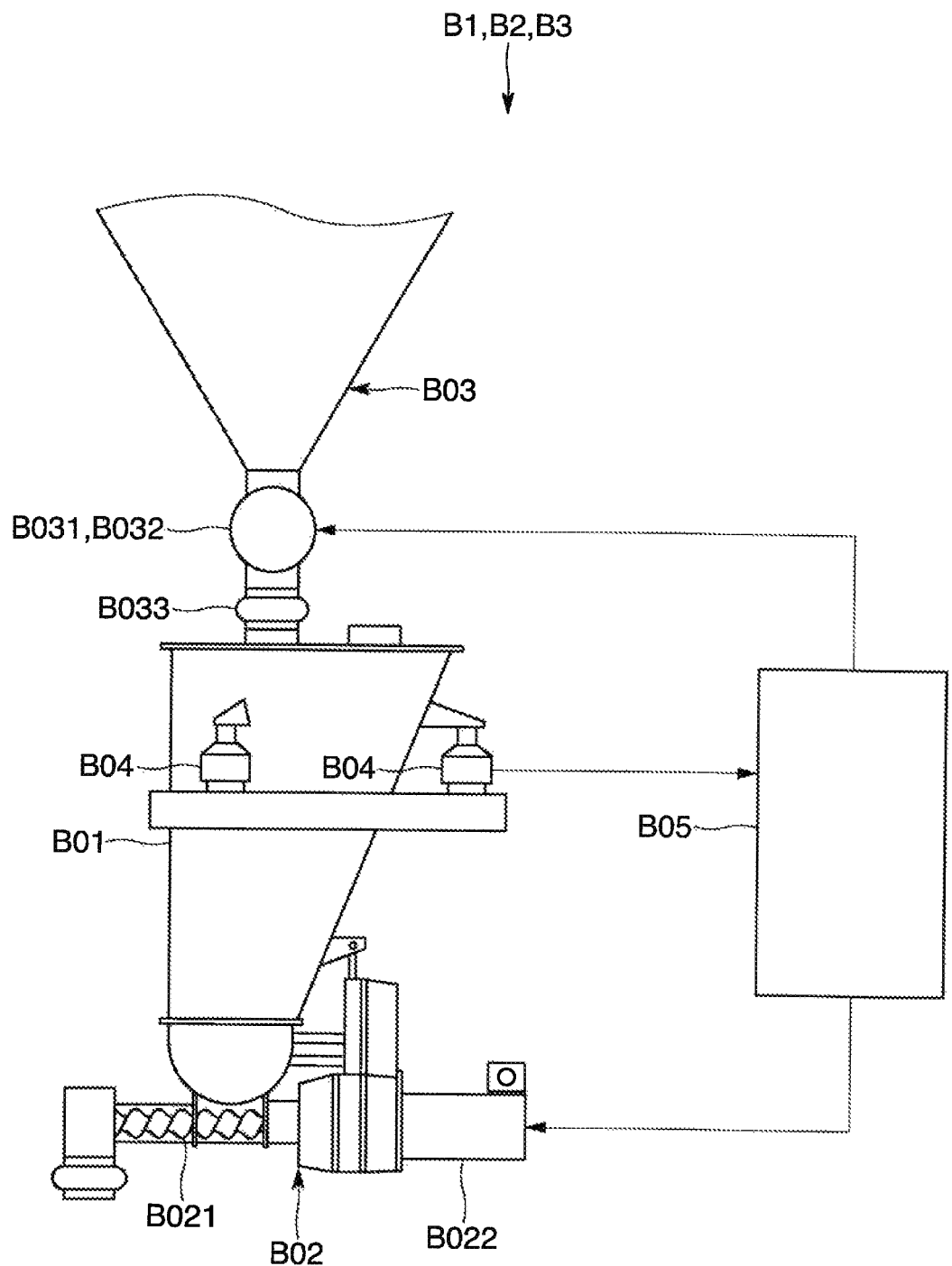
FIG. 5 is a side view of a powdery-material feeding device included in the powdery-material mixing and feeding system according to the exemplary embodiment.

The volumetric feeders B1 to B3 will be additionally described in terms of their structures. As shown exemplarily in FIG. 5, the feeders B1 to B3 each include a hopper B01 configured to reserve a powdery material, a transfer mechanism B02 configured to deliver and to discharge the powdery material fed from the hopper B01, a supply mechanism B03 configured to timely supply the hopper B01 with a powdery material, a measuring instrument B04 configured to measure a discharge flow rate per unit time of the powdery material delivered to be discharged by the transfer mechanism B02, and a controller B05 configured to control the transfer mechanism B02 to cause the flow rate of the discharged powdery material to have a required target value.

The transfer mechanism B02 includes a transfer member B021 configured to be in contact with the powdery material dropped from the hopper B01 and deliver the powdery material, and a motor B022 configured to drive to rotate the transfer member B021. Examples of the transfer mechanism B02 include a screw feeder, a table feeder, a circle feeder, a disk feeder, and a rotary feeder. The transfer member B021 in the screw feeder B02 is embodied by a screw blade including a shaft configured to rotate about an axis and spiral blades attached to the shaft. The screw blade is configured to transfer a powdery material caught between the adjacent blades along the axis. The transfer member in the table feeder, the circle feeder, the disk feeder, or the rotary feeder is configured by a rotary table, a flat bar (e.g., a rotary blade), a disk, or a rotor (equipped in a rotary valve), respectively. The exemplary embodiment assumes that the transfer mechanism B02 is configured by a screw feeder. The motor B022 configured to drive the transfer member B021 has rotational speed influencing a flow rate per unit time of a powdery material delivered by the transfer mechanism B02. Increase in rotational speed of the motor B022 typically leads to increase in flow rate of a delivered powdery material per unit time.

Examples of the motor B022 (and a motor B032 of the supply mechanism B03 to be described later) include a direct current (DC) motor, particularly a blushless DC motor. The DC motor has basic properties expressed by $$VM = I_a R_a + E_a$$

$$E_a = K_e N$$

$$T = K_t I_a = -(K_t K_e N)/R_a + (K_t VM)/R_a$$

In these equations, $V_M$ indicates power supply voltage applied to a coil of the DC motor, $I_a$ indicates a current flowing through the coil of the DC motor, $R_a$ indicates armature resistance, $E_a$ indicates voltage of counter electromotive force, T indicates torque generated by the DC motor, $K_t$ indicates a torque constant, $K_e$ indicates a counter electromotive force constant, and N indicates rotational speed of the DC motor.

The supply mechanism B03 is embodied by a rotary feeder or the like, is disposed above the hopper B01, and reserves a large amount of a powdery material to be supplied to the hopper B01. The supply mechanism B03 facing the hopper B01 has a rotary valve B031 disposed below the supply mechanism B03. The supply mechanism B03 opens the rotary valve B031 to supply the hopper B01 with the reserved powdery material when the powdery material in the hopper B01 decreases to reach a predetermined lower limit amount. When the powdery material in the hopper B01 increases to reach a predetermined upper limit amount, the supply mechanism B03 closes the rotary valve B031 to prevent the hopper B01 from being supplied with any more powdery material.

The measuring instrument B04 is configured to repetitively detect current weight of the hopper B01 and the powdery material reserved in the hopper B01. Decreased weight is equal to amounts of the powdery materials discharged from the volumetric feeders B1 to B3. Examples of the measuring instrument B04 include a load cell functioning as a strain gauge sensor, a tuning fork force sensor, and a force balance sensor. The supply mechanism B03 and the hopper B01 are connected to each other via a bellows joint B033 or the like, to prevent weight of the supply mechanism B03 itself and weight of the powdery material reserved in the supply mechanism B03 (and to be supplied to the hopper B01 later) from being applied to the hopper B01. The measuring instrument B04 does not detect the weight of the supply mechanism B03 and the powdery material reserved in the supply mechanism B03.

The controller B05 receives an output signal from the measuring instrument B04 to obtain weight of the powdery material currently reserved in the hopper B01, and controls the motor B022 configured to drive the transfer member (i.e., the screw blade of the screw feeder) B021 in the transfer mechanism B02 and the motor B032 configured to drive the rotor of the rotary valve B031 in the supply mechanism B03.

The controller B05 includes, as elements, a motor driver configured to turn ON or OFF the motors B022 and B032 and control rotational speed or output torque of the motors B022 and B032, a microcomputer configured to command the motor driver to achieve target rotational speed or output torque of the motors B022 and B032, a programmable controller, a widely used personal computer or work station, and the like. The motor driver sequentially applies current to coils of respective phases included in the motors B022 and B032 to rotate the motors B022 and B032, and controls the rotational speed and the output torque of the motors B022 and B032. Increase in current and/or voltage applied to the coils in the motors B022 and B032 leads to increase in output torque as well as increase in rotational speed of the motors B022 and B032. Decrease in current and/or voltage applied to the coils in the motors B022 and B032 leads to decrease in output torque as well as decrease in rotational speed of the motors B022 and B032. Each of the motors B022 and B032 may be controlled such that the current flowing in the coil is increased or decreased by pulse width modulation (PWM) control.

The controller B05 in each of the volumetric feeders B1 to B3 according to the exemplary embodiment basically feedback-controls (e.g., PID controls) the flow rate per unit time of the powdery material discharged from a corresponding one of the volumetric feeders B1 to B3 in accordance with the loss-in-weight system (i.e., loss integrated value system). Specifically, the measuring instrument B04 constantly measures weight of a powdery material discharged from the hopper B01 to be delivered by the transfer mechanism B02, compares the decreased weight and the preset target value of the discharge flow rate to find whether or not the decreased weight transitions to match the target value of the discharge flow rate, increases or decreases the rotational speed and/or the output torque of the motor B022 to decrease the difference therebetween, and increases or decreases the flow rates of the powdery materials discharged from the volumetric feeders B1 to B3.

The controller B05 further actuates the motor B032 configured to drive the rotor of the rotary valve B031 in the supply mechanism B03 to supply the hopper B01 with the powdery material reserved in the supply mechanism B03 when the powdery material in the hopper B01 decreases to reach the predetermined lower limit amount, as described earlier. If the powdery material in the hopper B01 increases to reach the predetermined upper limit amount, then the controller B05 stops the motor B032 to prevent the hopper B01 from being supplied with any more powdery material.

The exemplary embodiment assumes production of a pharmaceutical tablet. In order for mass production of nondefective tablets of high quality, it is quite important to keep, within a desired range, the percentage of the principal agent contained in the mixed-powdery materials fed from the powdery-material mixing and feeding system B to the molding machine A. That is, initially considered is control of the volumetric feeder B1 configured to reserve and discharge the principal agent.

Figure 6:
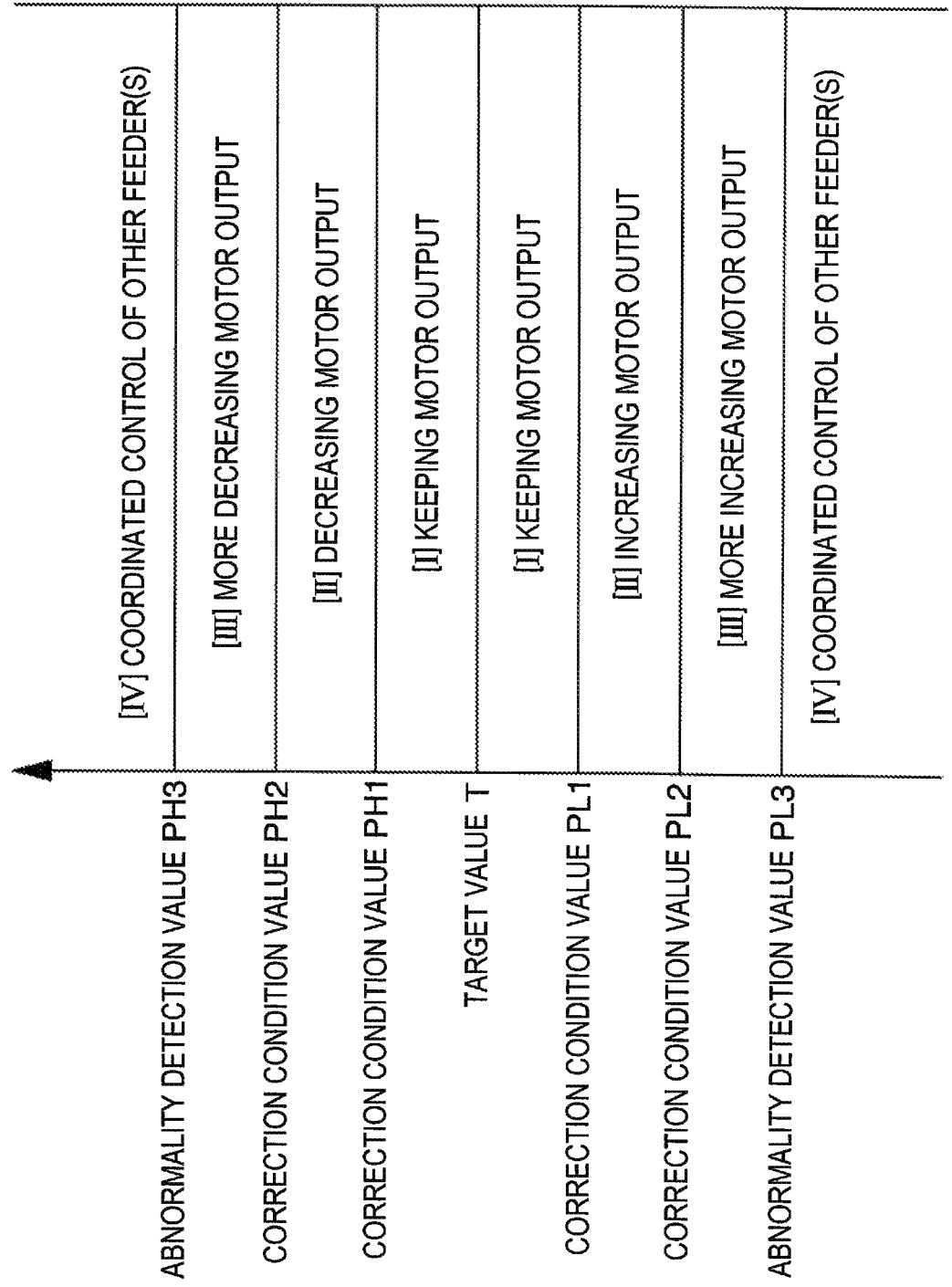
FIG. 6 is an explanatory view on control by a controller included in the powdery-material mixing and feeding system according to the exemplary embodiment.

The controller B05 switches control of the feeders B1 to B3 in accordance with a difference between a discharge flow rate of the principal agent measured by the measuring instrument B04 included in the feeder B1 and a target value T thereof. As indicated exemplarily in FIG. 6, the exemplary embodiment sets a plurality of correction condition values PH1, PH2, PL1, and PL2 and abnormality detection values PH3 and PL3 above and below the target value T of the flow rate of the principal agent discharged from the feeder B1. The correction condition value PH1 is more than the target value T, the correction condition value PH2 is more than the correction condition value PH1, and the abnormality detection value PH3 is still more than the correction condition value PH2. The correction condition value PL1 is less than the target value T, the correction condition value PL2 is less than the correction condition value PL1, and the abnormality detection value PL3 is still less than the correction condition value PL2. Each of the correction condition values PH1, PH2, PL1, and PL2 and the abnormality detection values PH3 and PL3 may be obtained by adding or subtracting a predetermined value to or from the target value T, or may be obtained by multiplying the target value T by a predetermined ratio. These values may be obtained exemplarily as follows.

the correction condition value PH1=the target value T×1.01 (i.e., increase the target value T by 1%)

the correction condition value PH2=the target value T×1.03 (i.e., increase the target value T by 3%)

the abnormality detection value PH3=the target value T×1.05 (i.e., increase the target value T by 5%)

the correction condition value PL1=the target value T×0.99 (i.e., decrease the target value T by 1%)

the correction condition value PL2=the target value T×0.97 (i.e., decrease the target value T by 3%)

the abnormality detection value PL3=the target value T×0.95 (i.e., decrease the target value T by 5%)

[I] When the flow rate of the principal agent discharged from the feeder B1 has an actually measured value between the correction condition value PH1 and the correction condition value PL1 interposing the target value T:

This means that the current discharge flow rate of the principal agent is close to the target value T and the discharge flow rate is adjusted appropriately. Accordingly, the controller B05 does not need to particularly increase or decrease current values of the current and the voltage applied to the coil of the motor B022 in the feeder B1, and can keep, without particularly increasing or decreasing, current values of the rotational speed and the output torque of the motor B022.

In this case, the controller B05 normally feedback-controls to keep at its target value the flow rate of the excipient or the like discharged from the feeder B2, and feedback-controls to keep at its target value the flow rate of the lubricant or the like discharged from the feeder B3. The target value of the flow rate of the powdery material discharged from the feeder B2 and the target value of the flow rate of the powdery material discharged from the feeder B3 are each set such that a value in proportion to the target value T or the actually measured value of the flow rate of the powdery material discharged from the feeder B1, and in other words, a ratio of each of the powdery materials contained in the mixed-powdery materials obtained by mixing the powdery materials (e.g., particularly a ratio of the principal agent in the mixed-powdery materials), falls within a desired range.

[II] When the flow rate of the principal agent discharged from the feeder B1 has an actually measured value between the correction condition value PH1 and the correction condition value PH2 or between the correction condition value PL1 and the correction condition value PL2:

This means that the current discharge flow rate of the principal agent is not close to the target value T, but the actually measured value and the target value T do not have a very large difference. Accordingly, the controller B05 feedback-controls to increase or decrease the rotational speed and/or the output torque of the feeder B1 so as to reduce the difference between the actually measured value and the target value T of the discharge flow rate of the principal agent. When the actually measured value of the discharge flow rate of the principal agent falls between the correction condition value PH1 and the correction condition value PH2, the discharge flow rate of the principal agent is more than the target value T. Accordingly, the current and/or the voltage applied to the motor B022 of the feeder B1 is decreased so as to decrease the discharge flow rate of the feeder B1. When the actually measured value of the discharge flow rate of the principal agent falls between the correction condition value PL1 and the correction condition value PL2, the discharge flow rate of the principal agent is less than the target value T. Accordingly, the current and/or the voltage applied to the motor B022 of the feeder B1 is increased so as to increase the discharge flow rate of the feeder B1.

In this case, the controller B05 normally feedback-controls to keep at its target value the flow rate of the excipient or the like discharged from the feeder B2, and feedback-controls to keep at its target value the flow rate of the lubricant or the like discharged from the feeder B3. The target value of the flow rate of the powdery material discharged from the feeder B2 and the target value of the flow rate of the powdery material discharged from the feeder B3 are each set such that a value in proportion to the target value T or the actually measured value of the flow rate of the powdery material discharged from the feeder B1, and in other words, a ratio of each of the powdery materials contained in the mixed-powdery materials obtained by mixing the powdery materials, falls within a desired range.

[III] When the flow rate of the principal agent discharged from the feeder B1 has an actually measured value between the correction condition value PH2 and the abnormality detection value PH3 or between the correction condition value PL2 and the abnormality detection value PL3:

This means that the actually measured value and the target value T of the current discharge flow rate of the principal agent have a relatively large difference. The controller B05 feedback controls to increase or decrease the rotational speed and/or the output torque of the feeder B1 so as to reduce the difference between the actually measured value and the target value T of the discharge flow rate of the principal agent. When the actually measured value of the discharge flow rate of the principal agent falls between the correction condition value PH2 and the abnormality detection value PH3, the discharge flow rate of the principal agent is more than the target value T. Accordingly, the current and/or the voltage applied to the motor B022 of the feeder B1 is decreased so as to decrease the discharge flow rate of the feeder B1. In this case, a decreased amount per unit time of the applied current, the applied voltage, the rotational speed, or the output torque, or a gain of feedback control (e.g., a proportional gain, an integral gain, or a derivative gain of PID control) has an absolute value more than that of the case lilt That is, the flow rate of the principal agent discharged from the feeder B1 is made to more quickly approach the target value Tin comparison to the case [II]. When the actually measured value of the discharge flow rate of the principal agent falls between the correction condition value PL2 and the abnormality detection value PL3, the discharge flow rate of the principal agent is less than the target value T. Accordingly, the current and/or the voltage applied to the motor B022 of the feeder B1 is increased so as to increase the discharge flow rate of the feeder B1. In this case, an increased amount per unit time of the applied current, the applied voltage, the rotational speed, or the output torque, or a gain of feedback control has an absolute value more than that of the case [II]. That is, the flow rate of the principal agent discharged from the feeder B1 is made to more quickly approach the target value T in comparison to the case [II].

Also in this case, the controller B05 normally feedback-controls the flow rate of the excipient or the like discharged from the feeder B2 to converge to the target value thereof, and feedback-controls the flow rate of the lubricant or the like discharged from the feeder B3 to converge to the target value thereof. The target value of the flow rate of the powdery material discharged from the feeder B2 and the target value of the flow rate of the powdery material discharged from the feeder B3 are each set such that a value in proportion to the target value T or the actually measured value of the flow rate of the powdery material discharged from the feeder B1, and in other words, a ratio of each of the powdery materials contained in the mixed-powdery materials obtained by mixing the powdery materials, falls within a desired range.

[IV] When the flow rate of the principal agent discharged from the feeder B1 has an actually measured value more than the abnormality detection value PH3 or less than the abnormality detection value PL3:

This means that the actually measured value of the current discharge flow rate of the principal agent is abnormally largely different from the target value T. Accordingly, feedback-control of the discharge flow rate of the feeder B1 may be insufficient to keep within the appropriate range the ratio of the principal agent contained in the mixed-powdery materials to be fed to the molding machine A. The controller B05 accordingly adjusts by increasing or decreasing the flow rate of the powdery material, other than the principal agent, discharged from the feeder B2 and/or the feeder B3 other than the feeder B1, to keep within the appropriate range the ratio of the principal agent contained in the mixed-powdery materials to be fed to the molding machine A. When the actually measured value of the discharge flow rate of the principal agent is more than the abnormality detection value PH3, the flow rate of the powdery material such as the excipient discharged from the feeder B2 is increased from its normal flow rate, and/or the flow rate of the powdery material such as the lubricant discharged from the feeder B3 is increased from its normal flow rate. When the actually measured value of the discharge flow rate of the principal agent is less than the abnormality detection value PL3, the flow rate of the powdery material such as the excipient discharged from the feeder B2 is decreased from its normal flow rate, and/or the flow rate of the powdery material such as the lubricant discharged from the feeder B3 is decreased from its normal flow rate. In this case, the flow rate of the powdery material discharged from the feeder B2 and/or the feeder B3 departs from the target value in proportion to the target value T of the original discharge flow rate of the principal agent.

The flow rate of the principal agent discharged from the feeder B1 may be controlled in a similar manner to that of the case [III].

In the case [IV], the flow rate per unit time of the mixed-powdery materials obtained by mixing the principal agent, the excipient, the lubricant, and the like and fed to the molding machine A is increased or decreased in comparison to the normal case [I], [II], or [III]. The controller B05 may adjust the rotational speed of the turret 3 and the punches 5 and 6 of the molding machine A in accordance with the feed flow rate. In a case where the flow rate of the mixed-powdery materials fed to the molding machine A is increased from the normal flow rate, the rotational speed of the turret 3 and the punches 5 and 6 is increased from the normal rotational speed to increase an amount per unit time of the mixed-powdery materials used by the molding machine A. In another case where the flow rate of the mixed-powdery materials fed to the molding machine A is decreased from the normal flow rate, the rotational speed of the turret 3 and the punches 5 and 6 is decreased from the normal rotational speed to decrease an amount per unit time of the mixed-powdery materials used by the molding machine A.

The exemplary embodiment provides a powdery-material mixing and feeding system B including a first powdery-material feeding device B1 configured to reserve and discharge a first powdery material (i.e., a principal agent) and a second powdery-material feeding device B2, B3 configured to reserve and discharge a second powdery material (i.e., an excipient, a lubricant, or the like other than the principal agent), the system being configured to feed a machine A configured to execute a post process with mixed-powdery materials obtained by mixing the first powdery material and the second powdery material discharged from the powdery-material feeding devices B1 and B2, B3 at a required ratio, in which a controller B05 is included for controlling a flow rate of the first powdery material discharged from the first powdery-material feeding device B1 and a flow rate of the second powdery material discharged from the second powdery-material feeding devices B2 and B3 to converge to respective target values thereof, wherein when the flow rate of the first powdery material discharged from the first powdery-material feeding device B1 departs from the target value by a predetermined amount or more, the controller B05 increases or decreases the flow rate of the second powdery material discharged from the second powdery-material feeding devices B2 and B3 such that the ratio of the first powdery material to the second powdery material contained in the mixed-powdery materials is kept within a desired range.

According to the exemplary embodiment, even when the flow rate of the first powdery material discharged from the first powdery-material feeding device B1 has rapid variation, the flow rate of the second powdery material discharged from the other second powdery-material feeding device B2, B3 can be adjusted by increasing or decreasing such that the ratio of the first powdery material to the second powdery material in the mixed-powdery materials fed to the machine A configured to execute a post process does not depart from the desired range. It is accordingly possible to continuously operate the molding machine A and the powdery-material mixing and feeding system B without output of an alert or a signal indicating abnormality.

The exemplary invention is not limited to the embodiment detailed above. As indicated exemplarily in FIG. 6, the exemplary embodiment changes control depending on within which of the ranges sectioned by the abnormality detection value PH3, the correction condition value PH2, the correction condition value PH1, the target value T, the correction condition value PL1, the correction condition value PL2, and the correction condition value PL3, the discharge flow rate of the feeder B1 falls.

The correction condition values PH1 and PH2 set between the target value T and the abnormality detection value PH3 is not limited to two in terms of the number thereof, but there can be obviously set one correction condition value, or three or more correction condition values.

Assume a case where there is set one correction condition value between the target value T and each of the abnormality detection values PH3 and PL3 and the correction condition values PH2 and PL2 are removed.

*When the actually measured value of the flow rate of the principal agent discharged from the feeder B1 falls between target value T and the correction condition value PH1 or between the target value T and the correction condition value PL1, the case [I] applies.

*When the actually measured value of the flow rate of the principal agent discharged from the feeder B1 falls between the correction condition value PH1 and the abnormality detection value PH3 or between the correction condition value PL1 and the abnormality detection value PL3, the case [II] applies.

*When the actually measured value of the flow rate of the principal agent discharged from the feeder B1 is more than the abnormality detection value PH3 or less than the abnormality detection value PL3, the case [IV] applies.

Assume another case where there are set three correction condition values between the target value T and each of the abnormality detection values PH3 and PL3 and additional correction condition values PH2' and PL2' are set between the correction condition values PH2 and PL2 and the abnormality detection values PH3 and PL3, respectively.

*When the actually measured value of the flow rate of the principal agent discharged from the feeder B1 falls between the correction condition value PH2 and the correction condition value PH2' or between the correction condition value PL2 and the correction condition value PL2', the case MU applies.

*When the flow rate of the principal agent discharged from the feeder B1 has an actually measured value between the correction condition value PH2' and the abnormality detection value PH3 or between the correction condition value PL2' and the abnormality detection value PH3, the controller B05 feedback-controls to increase or decrease the rotational speed and/or the output torque of the feeder B1 so as to reduce the difference between the actually measured value and the target value T of the discharge flow rate of the principal agent. In a case where the actually measured value of the discharge flow rate of the principal agent falls between the correction condition value PH2' and the abnormality detection value PH3, the current and/or the voltage applied to the coil of the motor B022 in the feeder B1 is decreased to decrease the discharge flow rate of the feeder B1. In this case, a decreased amount per unit time of the applied current, the applied voltage, the rotational speed, or the output torque, or a gain of feedback-control (e.g., a proportional gain, an integral gain, or a derivative gain of PID control) has an absolute value more than that of the case [III]. In another case where the actually measured value of the discharge flow rate of the principal agent falls between the correction condition value PL2' and the abnormality detection value PL3, the current and/or the voltage applied to the coil of the motor B022 in the feeder B1 is increased to increase the discharge flow rate of the feeder B1. In this case, an increased amount per unit time of the applied current, the applied voltage, the rotational speed, or the output torque, or a gain of feedback-control has an absolute value more than that of the case[III]. Also in this case, the controller B05 normally feedback-controls the flow rate of the excipient or the like discharged from the feeder B2 to converge to the target value thereof, and feedback-controls the flow rate of the lubricant or the like discharged from the feeder B3 to converge to the target value thereof.

*When the actually measured value of the flow rate of the principal agent discharged from the feeder B1 is more than the abnormality detection value PH3 or less than the abnormality detection value PL3, the case [IV] applies.

Moreover, specific configurations of the respective portions can be modified in various manners without departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A powdery-material mixing and feeding system comprising:
    a first powdery-material feeding device configured to reserve and discharge a first powdery material; and
    a second powdery-material feeding device configured to reserve and discharge a second powdery material, the powdery-material mixing and feeding system being configured to feed a machine configured to execute processing of a post process with mixed-powdery materials obtained by mixing the first powdery material and the second powdery material respectively discharged from the first and second powdery-material feeding devices at a required ratio, in which a controller is included for controlling a flow rate of the first powdery material discharged from the first powdery-material feeding device and a flow rate of the second powdery material discharged from the second powdery-material feeding device to converge to respective target values thereof,
    wherein when the flow rate of the first powdery material discharged from the first powdery-material feeding device departs from the target value thereof by a predetermined amount or more, the controller increases or decreases the flow rate of the second powdery material discharged from the second powdery-material feeding device such that the ratio of the first powdery material to the second powdery material contained in the mixed-powdery materials is kept within a desired range.

2. The powdery-material mixing and feeding system according to claim 1, wherein
    each of the first powdery-material feeding device and the second powdery-material feeding device includes a hopper configured to reserve the powdery material, a transfer member configured to deliver and to discharge the powdery material fed from the hopper, a motor configured to drive the transfer member, and a measuring instrument configured to measure an amount of the powdery material delivered by the transfer member to be discharged, and
    the controller
    adjusts, in a normal state, rotational speed of the motor or current or voltage applied to a coil of the motor in each of the first powdery-material feeding device and the second powdery-material feeding device such that the flow rate of the discharged powdery material measured by the measuring instrument is converged to the target value, and
    adjusts the rotational speed of the motor or the current or the voltage applied to the coil of the motor in the second powdery-material feeding device to increase or decrease the flow rate of the discharged second powdery material measured by the measuring instrument in the second powdery-material feeding device such that the ratio of the first powdery material to the second powdery material contained in the mixed-powdery materials is kept within the desired range when the flow rate of the discharged first powdery material measured by the measuring instrument in the first powdery-material feeding device departs from the target value by the predetermined amount or more.

3. The powdery-material mixing and feeding system according to claim 2, wherein
    there are set, by the controller, a correction condition value close to but unequal to and deviated from the target value of the flow rate of the discharged first powdery material, and an abnormality detection value more apart from the target value of the flow rate of the discharged first powdery material in comparison with the correction condition value, and
    the controller
    maintains the rotational speed of the motor or the current or the voltage applied to the coil of the motor in the first powdery-material feeding device when the flow rate of the first powdery material measured by the measuring instrument in the first powdery-material feeding device falls between the target value and the correction condition value,
    adjusts the rotational speed of the motor or the current or the voltage applied to the coil of the motor in the first powdery-material feeding device such that the flow rate of the first powdery material falls between the target value and the correction condition value when the flow rate of the first powdery material measured by the measuring instrument in the first powdery-material feeding device falls between the correction condition value and the abnormality detection value, and
    adjusts the rotational speed of the motor or the current or the voltage applied to the coil of the motor in the second powdery-material feeding device to increase or decrease the flow rate of the discharged second powdery material measured by the measuring instrument in the second powdery-material feeding device such that the ratio of the first powdery material to the second powdery material contained in the mixed-powdery materials is kept within the desired range when the flow rate of the first powdery material measured by the measuring instrument in the first powdery-material feeding device does not fall between the target value and the abnormality detection value.

4. The powdery-material mixing and feeding system according to claim 2, wherein each of the first and second powdery-material feeding devices further comprises a supply mechanism configured to supply the hopper with the powdery material, and
    wherein the controller is configured to control the transfer member to cause the flow rate of the discharged powdery material to converge to the target value.

5. The powdery-material mixing and feeding system according to claim 4, wherein the supply mechanism is disposed above the hopper, and reserves the powdery material to be supplied to the hopper, and
    wherein the supply mechanism facing the hopper includes a rotary valve disposed below the supply mechanism, and the supply mechanism opens the rotary valve to supply the hopper with the reserved powdery material when the powdery material in the hopper decreases to reach a predetermined lower limit amount, and when the powdery material in the hopper increases to reach a predetermined upper limit amount, the supply mechanism closes the rotary valve to prevent the hopper from being supplied with any more powdery material.

6. The powdery-material mixing and feeding system according to claim 5, wherein the measuring instrument is configured to repetitively detect current weight of the hopper and the powdery material reserved in the hopper, and
wherein the supply mechanism and the hopper are connected to each other via a bellows joint.

7. The powdery-material mixing and feeding system according to claim 4, wherein the controller receives an output signal from the measuring instrument to obtain a weight of the powdery material currently reserved in the hopper, and controls the motor configured to drive the transfer member and a second motor configured to drive a rotor of a rotary valve in the supply mechanism,
wherein the controller feedback-controls the flow rate per unit time of the powdery material discharged from a corresponding one of the first and second powdery-material feeding devices in accordance with a loss in weight of the system,
wherein the measuring instrument continually measures weight of a powdery material discharged from the hopper to be delivered by the transfer member, compares the decreased weight and the preset target value of the discharge flow rate to find whether or not the decreased weight transitions to match the target value of the discharge flow rate, increases or decreases at least one of rotational speed and output torque of the motor to decrease the difference therebetween, and increases or decreases the flow rates of the powdery materials discharged from the first and second powdery-material feeding devices,
wherein the controller further actuates the second motor of the supply mechanism configured to drive the rotor of the rotary valve in the supply mechanism to supply the hopper with the powdery material reserved in the supply mechanism when the powdery material in the hopper decreases to reach the predetermined lower limit amount, and if the powdery material in the hopper increases to reach the predetermined upper limit amount, the controller stops the second motor in the supply mechanism to prevent the hopper from being supplied with any more powdery material.

8. The powdery-material mixing and feeding system according to claim 1, further comprising first and second mixers respectively configured to mix the powdery materials discharged from the first and second powdery-material feeding devices and to discharge the mixed-powdery materials.

9. The powdery-material mixing and feeding system according to claim 8, wherein the first and second mixers respectively comprise a vertical mixer and a horizontal mixer connected to and disposed downstream of the vertical mixer,
wherein the vertical mixer mixes the powdery material discharged from the first powdery-material feeding device, and the powdery material discharged from the second powdery-material feeding device, and simultaneously drops the mixed-powdery materials toward the horizontal mixer,
wherein the vertical mixer includes a case having a funnel shape, a substantially vertical agitation shaft disposed in a center portion in the case and configured to spin, an agitating rotor integrally attached to the agitation shaft, and a motor configured to drive and to rotate the agitation shaft and the agitating rotor,
wherein the horizontal mixer mixes the powdery materials mixed by the vertical mixer, and simultaneously transfers the mixed-powdery materials toward the machine, and
wherein the horizontal mixer includes a case having a tubular shape extending substantially horizontally, a substantially horizontal agitation shaft disposed in a center portion in the case and configured to spin, an agitating rotor attached to the agitation shaft, and a motor configured to drive to rotate the agitation shaft and the agitating rotor.

10. A powdery-material mixing and feeding system comprising:
a first powdery-material feeding device configured to reserve and discharge a first powdery material;
a second powdery-material feeding device configured to reserve and discharge a second powdery material, the powdery-material mixing and feeding system being configured to feed a machine configured to execute processing of a post process with mixed-powdery materials obtained by mixing the first powdery material and the second powdery material respectively discharged from the first and second powdery-material feeding devices at a required ratio; and
a controller for controlling a rate of the first powdery material discharged from the first powdery-material feeding device and a rate of the second powdery material discharged from the second powdery-material feeding device to converge to respective target values thereof,
wherein when the rate of the first powdery material discharged from the first powdery-material feeding device departs from the target value thereof by a predetermined amount or more, the controller adjusts the rate of the second powdery material discharged from the second powdery-material feeding device such that the ratio of the first powdery material to the second powdery material contained in the mixed-powdery materials is kept within a desired range.

11. The powdery-material mixing and feeding system according to claim 10, wherein each of the first powdery-material feeding device and the second powdery-material feeding device includes a hopper configured to reserve the powdery material, a transfer member configured to deliver and to discharge the powdery material fed from the hopper, a motor configured to drive the transfer member, and a measuring instrument configured to measure an amount of the powdery material delivered by the transfer member to be discharged.

12. The powdery-material mixing and feeding system according to claim 11, wherein
the controller adjusts, in a normal state, a rotational speed of the motor or current or voltage applied to a coil of the motor in each of the first powdery-material feeding device and the second powdery-material feeding device such that the rate of the discharged powdery material measured by the measuring instrument is converged to the target value.

13. The powdery-material mixing and feeding system according to claim 12, wherein
the controller adjusts a rotational speed of a motor or the current or the voltage applied to the coil of the motor in the second powdery-material feeding device to adjust the rate of the discharged second powdery material measured by the measuring instrument in the second powdery-material feeding device such that the ratio of the first powdery material to the second powdery material contained in the mixed-powdery materials is kept within the desired range when the rate of the discharged first powdery material measured by the measuring instrument in the first powdery-material feeding device departs from the target value by the predetermined amount or more.

14. The powdery-material mixing and feeding system according to claim 13, wherein there are set, by the controller, a correction condition value close to but unequal to and deviated from the target value of the rate of the discharged first powdery material, and an abnormality detection value more apart from the target value of the rate of the discharged first powdery material in comparison with the correction condition value, and wherein the controller maintains the rotational speed of the motor or the current or the voltage applied to the coil of the motor in the first powdery material when the rate of the first powdery material measured by the measuring instrument in the first powdery-material feeding device falls between the target value and the correction condition value.

15. The powdery-material mixing and feeding system according to claim 14, wherein
the controller adjusts the rotational speed of the motor or the current or the voltage applied to the coil of the motor in the first powdery-material feeding device such that the rate of the first powdery material falls between the target value and the correction condition value when the rate of the first powdery material measured by the measuring instrument in the first powdery-material feeding device falls between the correction condition value and the abnormality detection value.

16. The powdery-material mixing and feeding system according to claim 15, wherein
the controller adjusts the rotational speed of the motor or the current or the voltage applied to the coil of the motor in the second powdery-material feeding device to adjust the rate of the discharged second powdery material measured by the measuring instrument in the second powdery-material feeding device such that the ratio of the first powdery material to the second powdery material contained in the mixed-powdery materials is kept within the desired range when the rate of the first powdery material measured by the measuring instrument in the first powdery-material feeding device does not fall between the target value and the abnormality detection value.

17. The powdery-material mixing and feeding system according to claim 10, further comprising first and second mixers respectively configured to mix the powdery materials discharged from the first and second powdery-material feeding devices and to discharge the mixed-powdery materials.

18. The powdery-material mixing and feeding system according to claim 17, wherein the first and second mixers respectively comprise a vertical mixer and a horizontal mixer connected to and disposed downstream of the vertical mixer, and wherein the vertical mixer mixes the powdery material discharged from the first powdery-material feeding device, and the powdery material discharged from the second powdery-material feeding device, and simultaneously drops the mixed-powdery materials toward the horizontal mixer.

19. The powdery-material mixing and feeding system according to claim 18, wherein the vertical mixer includes a case having a funnel shape, a substantially vertical agitation shaft disposed in a center portion in the case and configured to spin, an agitating rotor integrally attached to the agitation shaft, and a motor configured to drive and to rotate the agitation shaft and the agitating rotor.

20. The powdery-material mixing and feeding system according to claim 18, wherein the horizontal mixer mixes the powdery materials mixed by the vertical mixer, and simultaneously transfers the mixed-powdery materials toward the machine, and wherein the horizontal mixer includes a case having a tubular shape extending substantially horizontally, a substantially horizontal agitation shaft disposed in a center portion in the case and configured to spin, an agitating rotor attached to the agitation shaft, and a motor configured to drive to rotate the agitation shaft and the agitating rotor.

* * * * *